UNITED STATES PATENT OFFICE.

DANIEL E. SOMES, OF WASHINGTON, DISTRICT OF COLUMBIA.

IMPROVED COMPOSITION FOR FORMING USEFUL AND ORNAMENTAL ARTICLES.

Specification forming part of Letters Patent No. 59,154, dated October 23, 1866.

*To all whom it may concern:*

Be it known that I, DANIEL E. SOMES, of Washington, District of Columbia, have invented a new Process for making Busts, Molds, and other articles of utility and ornament.

The nature of my invention consists in mixing or combining in various proportions the following substances for the manufacture of busts, statues, molds, vases, wares, chessmen, and other articles.

My invention also consists in mixing and using substances for plastering, hard-finish, stucco, and the like.

I mix, first, soap-stone dust with gypsum or plaster-of-paris; second, soap-stone dust with plaster-of-paris and brimstone or sulphur; third, soap-stone dust, lime, and plaster-of-paris, pipe-clay, blue clay, or other clays, brimstone, marble-dust, or other stone-dust, black lead, red lead, white lead, sand, litharge, zinc, or their equivalents; fourth, soap-stone dust with cartilaginous or glutinous substances, varnishes, or their equivalents; soap-stone dust, gum-shellac, copal or other gums, brimstone, and the like; soap-stone dust and india-rubber subjected to heat, with or without brimstone or sulphur, to be used as a substitute for vulcanized rubber.

In preparing compounds for dressing or covering the surface of leather, cloth, paper, and the like, I use soap-stone dust, paraffine, oils, or glycerine or varnish, or all these together.

In dressing the above-named articles in imitation of patent-leather, enameled leather, paper, or cloth, or oil-cloth, or oil-silk, proper driers are added and heat applied to give to the composition tenacity. Coloring properties are also added when desirable. Soapstone dust when sprinkled over the surface of india-rubber goods, oil-cloth, oil-silk, enameled leather, or cloth, or any other article having an adhesive surface, will prevent such surfaces from adhering to other articles.

Paper, silk, cloth, and the like moistened or saturated with oil, varnish, glue, cement, or any adhesive substance, and sprinkled or covered with soap-stone dust, and dried by heat or otherwise, forms a good and cheap article to interpose between government and other adhesive stamps, to prevent them from adhering to one another and to other articles.

I claim any two or more of the foregoing ingredients or substances, or their equivalents, when mixed with water, alcohol, spirits of turpentine, steam, or their equivalents.

Having described my invention, what I claim as new, and desire to secure by Letters Patent, is—

The combination of the substances or their equivalents, as herein described.

D. E. SOMES.

Witnesses:
   CHAS. HERRON,
   F. C. SOMES.